July 25, 1933.        J. C. McCUNE        1,919,444
FLUID PRESSURE BRAKE
Filed Oct. 22, 1931
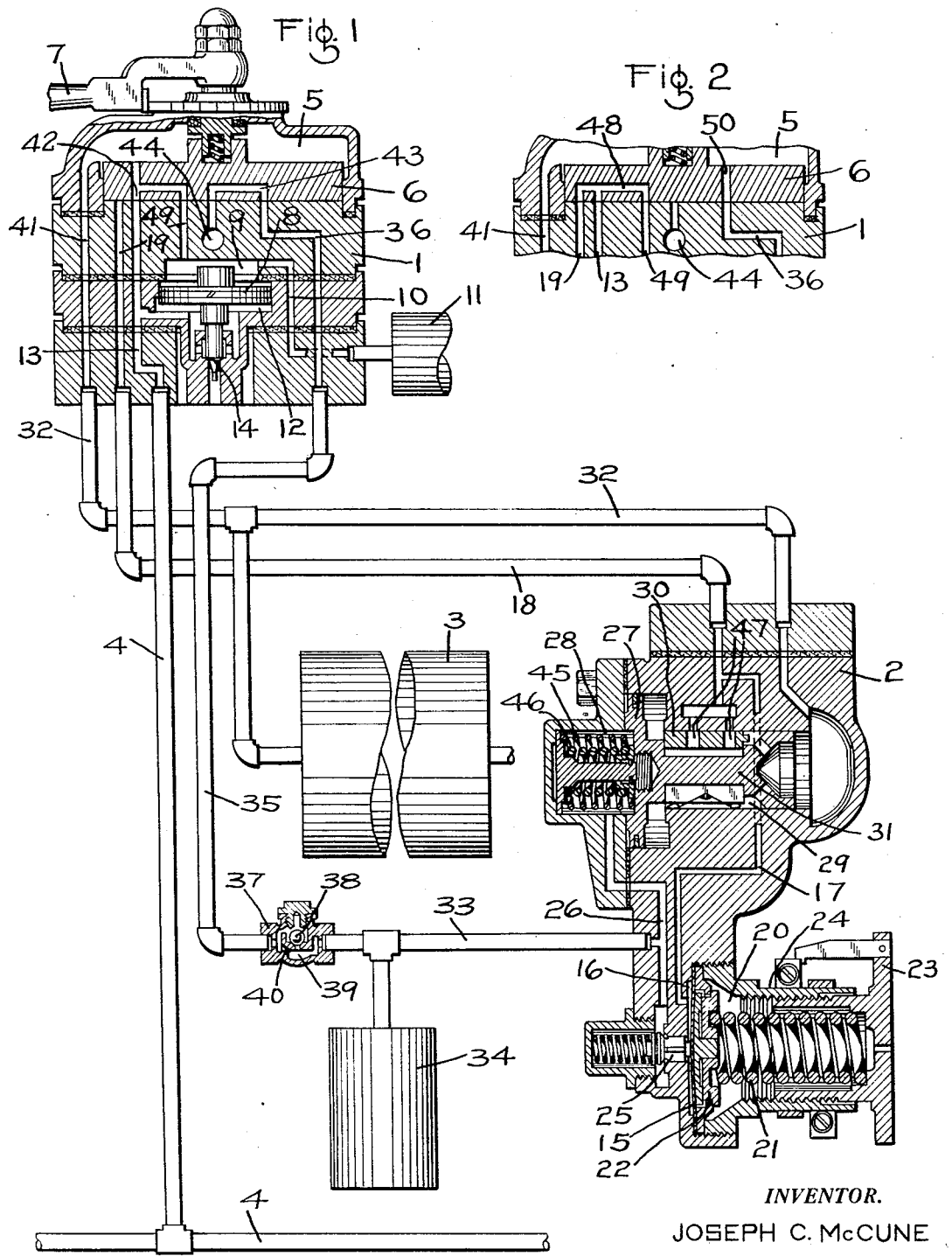
INVENTOR.
JOSEPH C. McCUNE
By *Wm. M. Cady*
ATTORNEY.

Patented July 25, 1933

1,919,444

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 22, 1931. Serial No. 570,285.

This invention relates to fluid pressure brakes, and more particularly to a fluid pressure brake system in which the cars of the train are equipped with means operative upon a sudden or emergency rate of reduction in brake pipe pressure for effecting an emergency application of the brakes. Such means include a control chamber which is adapted to be charged with fluid under pressure from the brake pipe.

In releasing the brakes of the conventional fluid pressure brake system, the brake valve device is first turned to release position, in which fluid at main reservoir pressure is supplied to the brake pipe, and then to running position, in which a feed valve device operates to maintain the brake pipe pressure at the standard pressure carried in the brake system.

While the brake valve device is in release position, the brake pipe pressure on cars at the head end of the train is temporarily raised above the normal, and the control chamber of the emergency means is thus liable to be overcharged with fluid under pressure.

When the brake valve device is moved from release to running position, the pressure in the brake pipe is liable to subside or fall back to the normal pressure at an emergency rate. The result is that the emergency control chamber having been overcharged, if the pressure in the brake pipe reduces at an emergency rate, a pressure differential between the control chamber and the brake pipe is created, which is sufficient to cause the emergency means to act to effect an emergency application of the brakes.

The principal object of my invention is to provide means for overcoming the above difficulty, which so operates that the pressure in the brake pipe will not reduce at an emergency rate when the brake valve device is moved from release to running position.

In the accompanying drawing; Fig. 1 is a diagrammatic view, partly in section, of a portion of a locomotive brake equipment, with my invention embodied therein; and Fig. 2 a sectional view of a portion of the brake valve device, showing the rotary valve in running position.

The fluid pressure brake equipment shown in the drawing includes a brake valve device 1, a feed valve device 2, a main reservoir 3, and a brake pipe 4.

The brake valve device 1 may comprise a casing having a valve chamber 5, containing a rotary valve 6, adapted to be operated by a handle 7. On the brake valve casing is disposed the usual equalizing discharge valve mechanism comprising a piston 8, having the chamber 9 at one side connected by a passage 10 with the usual equalizing reservoir 11, and having the chamber 12 at the opposite side connected, through passage 13 with the brake pipe 4. The piston 8 is adapted to operate a discharge valve 14 for venting fluid under pressure from the chamber 12 and the brake pipe to the atmosphere.

The feed valve device 2 may comprise a regulating portion and a fluid pressure supply portion. The regulating portion comprises a flexible diaphragm 15 having the chamber 16 at one side connected through a passage 17 with a feed valve pipe 18, which communicates with a passage 19, leading to the seat of rotary valve 6. In the chamber 20 at the opposite side of the diaphragm is mounted a coil spring 21 which acts on the diaphragm through a follower plate 22. The compression of the spring 21 may be varied by the operation of a rotatable member 23, having screw-threaded engagement in the casing 24.

The diaphragm 15 is adapted to operate a valve 25, which controls communication from chamber 16 to a passage 26.

The supply portion may comprise a piston 27, having the chamber 28 at one side connected to passage 26 and having a valve chamber 29 at the opposite side containing a slide valve 30, adapted to be operated, through stem 31, by piston 27. The valve chamber 29 is connected to pipe 32, leading to the main reservoir 3. Passage 26 is connected to a pipe 33, which opens into a volume reservoir 34, and said reservoir is also connected to a pipe 35 which communicates with a passage 36, leading to the seat of the rotary valve 6. In the pipe 35 is mounted a check valve casing 37, containing a ball check valve 38, which permits flow from the reservoir 34, through pipe 35, but prevents back flow. A by-pass passage 39 provides a communication around the check valve 38 and has a restricted flow portion 40. The main reservoir 3 is connected to the rotary valve chamber 5, through pipe 32 and passage 41.

In operation, when the brake valve device is turned to release position, as shown in Fig. 1, fluid under pressure is supplied directly from the main reservoir 3 to the brake pipe by flow from the rotary valve chamber 5, through port 42 in the rotary valve 6 and passage 13.

In release position, passage 36 is connected, through a cavity 43 in the rotary valve 6 with atmospheric exhaust port 44, so that pipe 35 and the reservoir 34 is vented to the atmosphere as well as piston chamber 28 of the supply portion of the feed valve device. The valve chamber 29 being subject to fluid at main reservoir pressure, the piston 27 is shifted to its extreme outer or left hand position, as shown in Fig. 1, compressing the springs 45 and 46. With piston 27 in this position, the slide valve 30 is in its full open position, so that fluid under pressure is supplied from valve chamber 29 and the main reservoir 3, through ports 47 in the valve, to the feed valve pipe 18.

When the brake valve device is turned from release position to running position, the rotary valve 6 is moved, so that passage 19 is connected, through cavity 48 in the rotary valve 6, with passage 13 and passage 49.

It will be noted that when the brake valve is moved from release to running position, the piston 27 and valve 30 of the feed valve device are in full open supply position, as shown in Fig. 1, so that initially, with the brake valve in running position, fluid under pressure is supplied by the feed valve device through passage 13 to the brake pipe and through passage 49 to the equalizing piston chamber 9.

As a result, the pressure in the brake pipe which was raised above normal while the brake valve was in release position, does not fall immediately, or so long as the feed valve supply valve 30 remains in its full open position.

In the running position of the brake valve, passage 36 is connected to a port 50 through the rotary valve 6, so that fluid at main reservoir pressure is supplied from the rotary valve chamber 5 to pipe 35. Fluid flows from pipe 35 at a restricted rate through port 40 to pipe 33, and gradually builds up the pressure in chamber 34 and in piston chamber 28.

As the pressure gradually increases in piston chamber 28, the piston 27 is gradually moved to the right, so that the slide valve 30 is shifted to gradually restrict the flow area of the supply ports 47 and finally entirely close same.

As the flow of fluid through the supply ports 47 is reduced, the brake pipe pressure reduces, until the brake pipe pressure finally falls to the normal standard pressure carried in the brake pipe, or the pressure at which the feed valve device is set to operate.

With the brake valve device in running position, the feed valve device then operates to maintain the pressure in the brake pipe in the usual manner. The diaphragm 15 of the regulating portion of the feed valve device is subject to the pressure of fluid in the pipe 18, as supplied through passage 17, and pipe 18 and passage 19 being connected to the brake pipe through cavity 48 and passage 13, when the brake pipe pressure falls below the pressure for which the regulating spring 21 is adjusted, the diaphragm 15 is actuated to unseat the valve 25. Fluid under pressure is then vented from piston chamber 28 at a faster rate than it is supplied through port 40, so that piston 27 is then operated to shift the slide valve 30, so as to open the ports 47. When the brake pipe pressure has been increased by flow through the feed ports 47 to a degree slightly exceeding the pressure of spring 21, the diaphragm 15 is operated to permit the valve 25 to seat. The fluid pressures then equalizing on opposite sides of piston 27, the pressure in chamber 28 being built up by flow through the restricted port 40, the springs 45 and 46 operate to shift the piston 27 and the valve 30 to its closed position.

It will thus be seen that with the above described construction, when the brake valve device is moved from release to running position, the brake pipe pressure is not allowed to suddenly reduce to the normal pressure, but is gradually reduced from the excess pressure degree to the normal degree. As a consequence, the brake pipe pressure is not reduced at an emergency rate, and therefore the emergency means on the cars of the train are not operated during this release operation, since if the emergency control chamber of the emergency means should be overcharged in release position, it will not cause operation of the emergency means, because the brake pipe pressure is not reduced at an emergency rate when the brake valve device is turned to running position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a feed valve device operated by variations in brake pipe pressure for controlling the supply of fluid under pressure to the brake pipe, means for delaying the operation of said feed valve device, and a brake valve device for rendering said delay means effective.

2. In a fluid pressure brake, the combination with a brake pipe, of a feed valve device comprising a supply valve means operated by variations in fluid pressure for controlling the supply of fluid under pressure to the brake pipe and a regulating valve means subject to brake pipe pressure for varying the fluid pressure on said supply valve means, a brake valve device having a position in which fluid under pressure is supplied to said supply valve means, and means for delaying the supply of fluid from said brake valve device to said supply valve means.

3. In a fluid pressure brake, the combination with a brake pipe, of a feed valve device including a supply valve means operated by a reduction in fluid pressure for supplying fluid under pressure to the brake pipe, a brake valve device having a position in which fluid under pressure is supplied to said supply valve means, and means for restricting the rate at which said brake valve device supplies fluid under pressure to said supply valve means.

4. In a fluid pressure brake, the combination with a brake pipe, of a feed valve device including a supply valve means operated by a reduction in fluid pressure for supplying fluid under pressure to the brake pipe, and a brake valve device having one position in which fluid is vented from said supply valve means and another position in which fluid under pressure is supplied to said valve means.

5. In a fluid pressure brake, the combination with a brake pipe, of a feed valve device including a supply valve means operated by a reduction in fluid pressure for supplying fluid under pressure to the brake pipe and upon an increase in brake pipe pressure for cutting off the supply of fluid to the brake pipe, and a brake valve device having a release position in which fluid is vented from said supply valve means and a running position in which fluid under pressure is supplied to said supply valve means at a restricted rate.

6. In a fluid pressure brake, the combination with a brake pipe, of a feed valve device having a supply valve means operated upon a reduction in fluid pressure for supplying fluid under pressure to the brake pipe and upon an increase in fluid pressure for cutting off the supply of fluid to the brake pipe, a volume reservoir connected to said supply valve means, and a brake valve device having one position in which said volume reservoir and said supply valve means are vented to the atmosphere and another position in which fluid under pressure is supplied to said volume reservoir and said supply valve means.

7. In a fluid pressure brake, the combination with a brake pipe, of a feed valve device having a supply valve means operated upon a reduction in fluid pressure for supplying fluid under pressure to the brake pipe and upon an increase in fluid pressure for cutting off the supply of fluid to the brake pipe, a volume reservoir connected to said supply valve means, a brake valve device adapted in release position to vent fluid from said supply valve means and said reservoir to the atmosphere and in running position to supply fluid under pressure to said reservoir and said supply valve means, and means for restricting the rate at which said brake valve device supplies fluid under pressure to said reservoir and said supply valve means.

8. In a fluid pressure brake, the combination with a brake pipe, of a feed valve device comprising a supply valve means operated by a reduction in fluid pressure for supplying fluid under pressure to the brake pipe, and by an increase in fluid pressure for cutting off the supply of fluid under pressure to the brake pipe, and a regulating valve means operated by variations in brake pipe pressure for varying the fluid pressure on said supply valve means, and a brake valve device having a release position in which fluid is vented from said supply valve means and a running position in which fluid under pressure is supplied to said supply valve means at a restricted rate.

9. In a fluid pressure brake, the combination with a brake pipe, of a feed valve device comprising a supply valve means operated by a reduction in fluid pressure for supplying fluid under pressure to the brake pipe, and by an increase in fluid pressure for cutting off the supply of fluid under pressure to the brake pipe, and a regulating valve means operated by variations in brake pipe pressure for varying the fluid pressure on said supply valve means, a volume reservoir, a brake valve device having a release position in which fluid is vented from said reservoir and said supply valve means, and a running position in which fluid is supplied to said volume reservoir and said supply valve means, and means for restricting the rate at which said brake valve device supplies fluid to said reservoir and said supply valve means.

JOSEPH C. McCUNE.